May 19, 1925.  1,538,598
C. W. SKINNER
CULTIVATOR
Filed Oct. 22, 1921    3 Sheets-Sheet 1

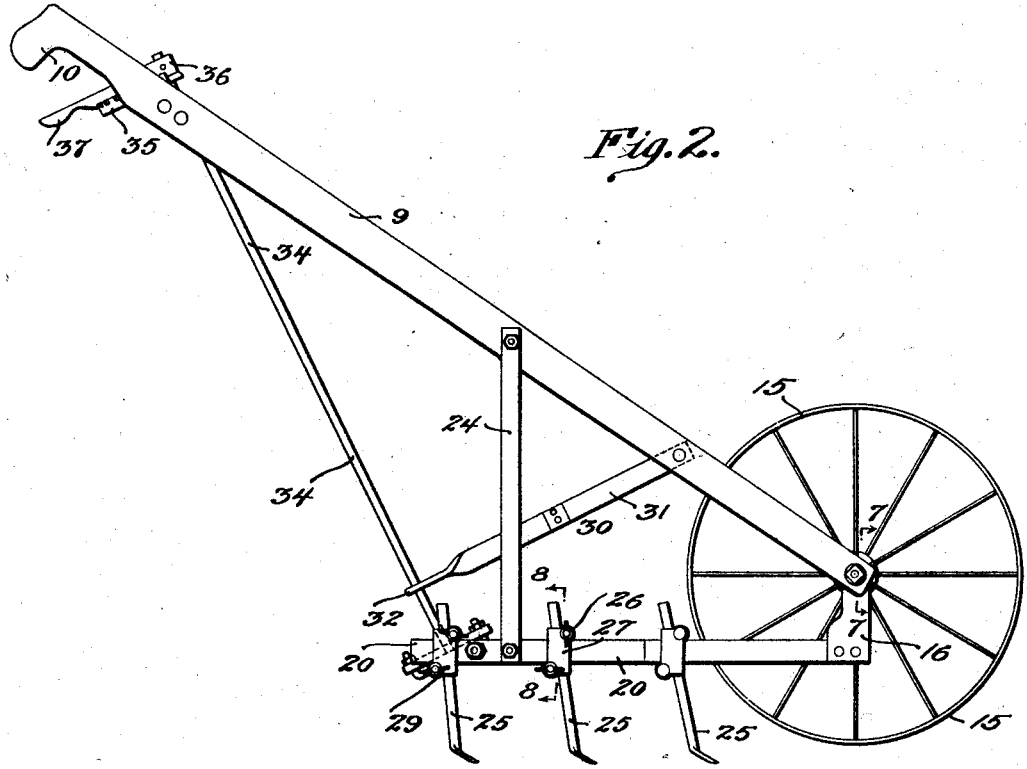
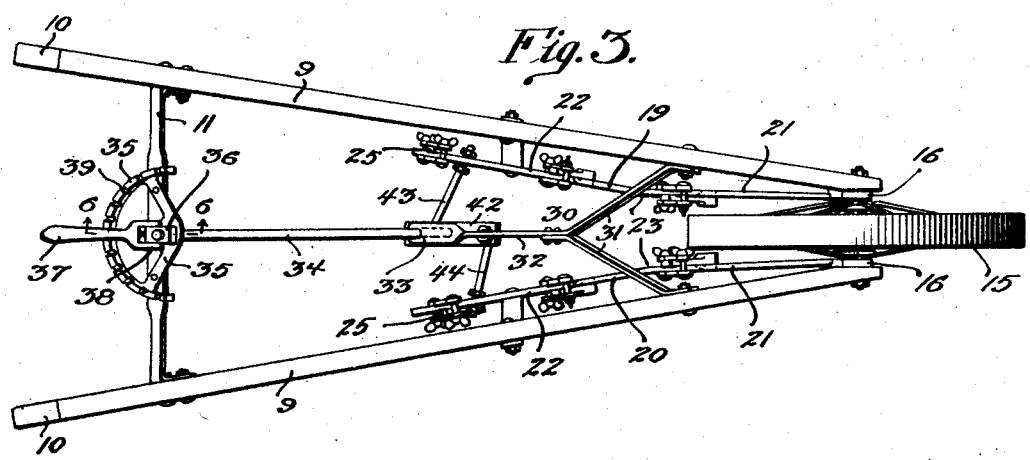

May 19, 1925.
C. W. SKINNER
1,538,598
CULTIVATOR
Filed Oct. 22, 1921   3 Sheets-Sheet 3
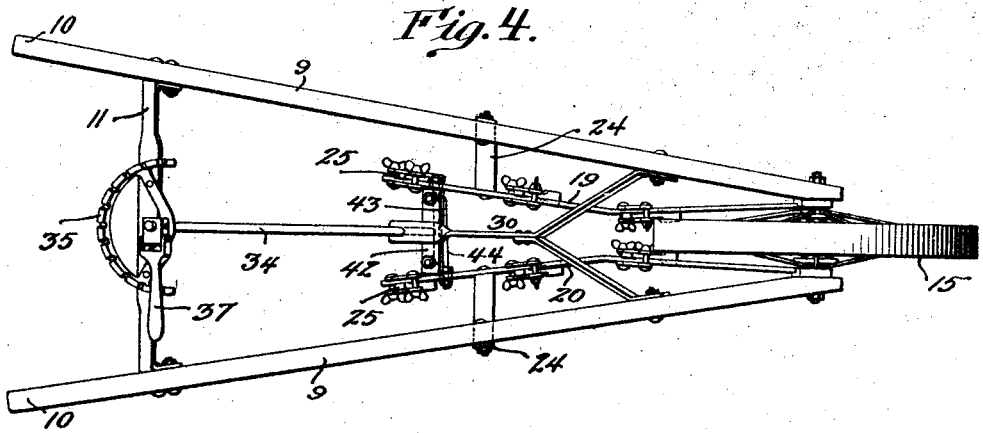
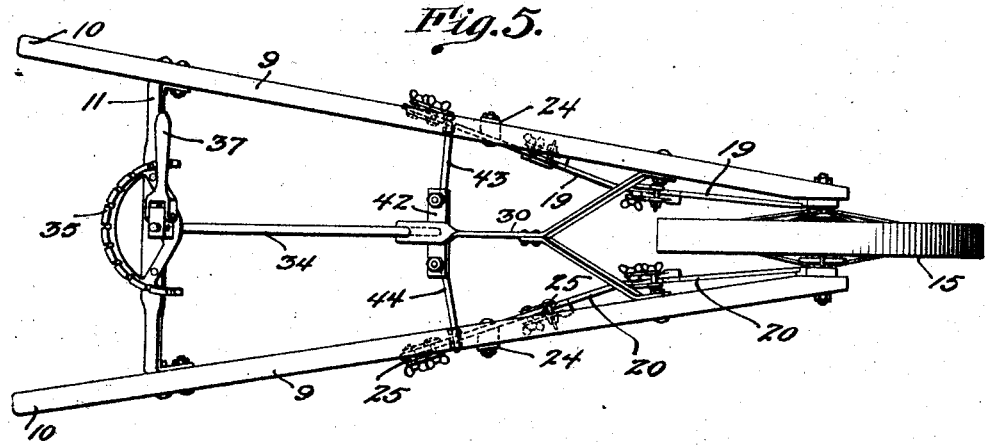
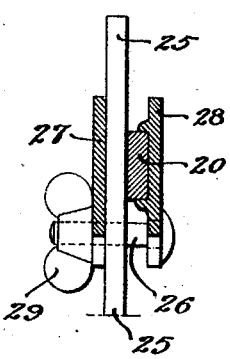

Patented May 19, 1925.

1,538,598

UNITED STATES PATENT OFFICE.

CHARLES W. SKINNER, OF NEWFIELD, NEW JERSEY.

CULTIVATOR.

Application filed October 22, 1921. Serial No. 509,655.

*To all whom it may concern:*

Be it known that I, CHARLES W. SKINNER, a citizen of the United States, residing at Newfield, in the county of Gloucester and State of New Jersey, have invented certain new and useful Improvements in Cultivators, of which the following is a specification.

One object of my invention is to provide an improved cultivator in which the ground breaking members can be readily moved transversely so that when cultivating between two rows of plants, in which the width of the space between said rows varies, the positions of the ground-engaging members can be readily changed to properly break up the soil merely by running the cultivator through said space but once and at the same time insuring cultivation close up to the plants.

Another object is to so construct my improved cultivator that it can be easily manipulated and will be of a strong and durable construction and readily manufactured.

Figure 1:
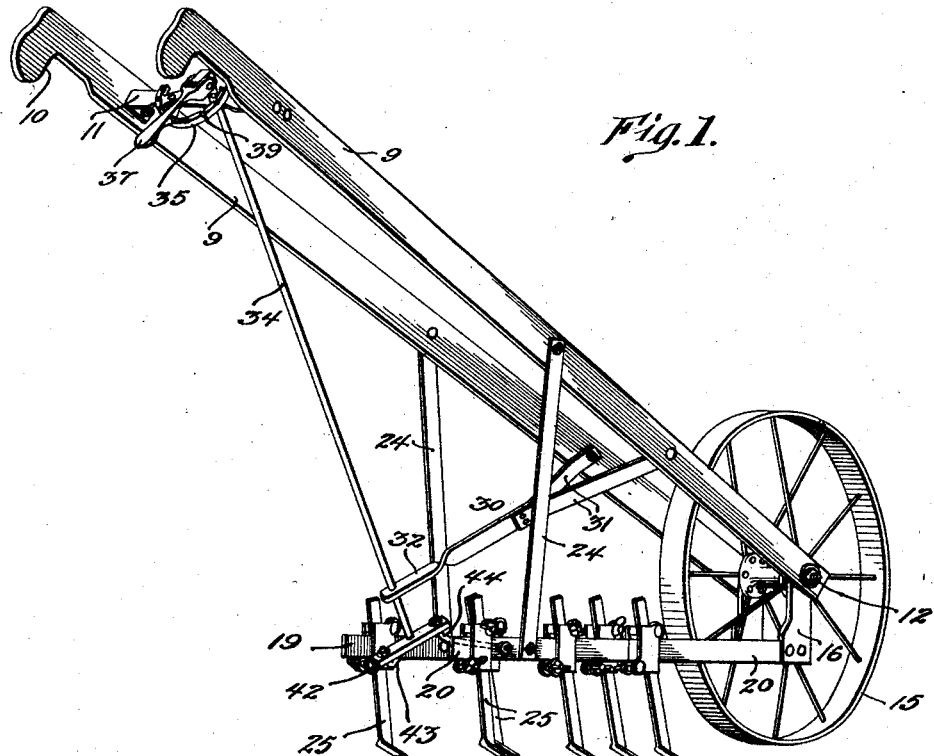
Figure 6:
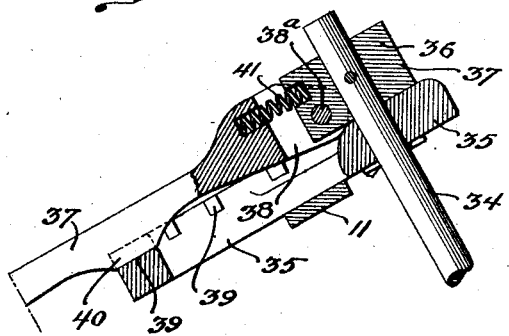
Figure 7:
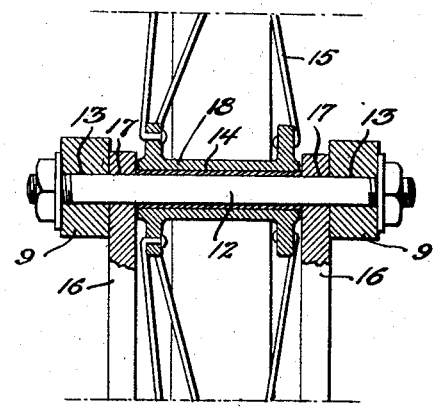

These objects, and other advantageous ends which will be described hereinafter, I attain in the following manner, reference being had to the accompanying drawings in which Figure 1 is a perspective view of a cultivator made in accordance with my invention, Figure 2 is a side elevation of said cultivator, Figure 3 is a top plan view of Figure 2, Figures 4 and 5 are top plan views of said cultivator showing the ground-engaging elements moved into different positions from those shown in Figure 3, Figure 6 is an enlarged fragmentary section taken on the line 6—6 of Figure 3, Figure 7 is an enlarged fragmentary section taken on the line 7—7 of Figure 2, and Figure 8 is a fragmentary enlarged section taken on the line 8—8 of Figure 2.

Referring to the drawings, 9 represents two handle bars which may be made of wood and which are secured together adjacent their hand-hold portions 10 by a transversely extending brace bar 11. These handle bars slant downward and at their lower ends are closer together than at their upper ends. The lower ends of the handle bars have a transversely extending axle 12 which passes through holes 13 therein, and said axle is made in the form of a bolt. A sleeve or bushing 14 is mounted on the axle 12 and a ground-engaging wheel 15 is rotatably mounted on said bushing; said ground-engaging wheel extending between the handle bars adjacent their lower ends.

Two metallic hangers 16 are secured between the ends of the bushing 14 and the inner surfaces of the handle bars, and said hangers have holes 17 through which the axle 12 extends. The bushing 14 is slightly longer than the length of the hub 18 so that the hangers 16 can be securely clamped between the handle bars and the ends of the bushing without interfering with the free rotation of the wheel 15; this construction being clearly illustrated in Figure 7.

Two rails 19 and 20 have their forward ends secured to the hangers 16 preferably by riveting or otherwise securely connecting the same. The rails 19 and 20 are preferably made of spring metal such as spring steel and of flat or rectangular cross section as shown in Figure 8. The normal position of these rails 19 and 20 is shown in Figure 3 and when in this position they are not under tension; the rails having portions 21 which are approximately parallel and other portions 22 which normally flare outward with respect to each other; this outward flaring being produced by the slight bend in the bars as shown at 23. At positions to the rear of the hangers, the rails 19 and 20 are suspended by metallic straps 24; said straps being preferably made of metal and being secured to the handle bars 9 and to the rails preferably by bolts as illustrated.

Ground-engaging elements, in the form of cultivator teeth 25, can be clamped in any desired positions to the rails 19 and 20 by means of bolts 26 which extend through clamping plates 27 and 28; said bolts preferably being provided with thumb or wing nuts 29; each set of plates 27 and 28 having two bolts 26 arranged to pass through diagonally opposite corners of the plates so that the cultivator teeth 25 will extend between the bolts and will also be held between the rail and the plate 27 of each set of clamping plates as clearly shown in Figures 1, 2 and 8.

A bracket 30 at one end is bifurcated; the furcations 31 being secured respectively to the handle bars 9. A centrally disposed arm 32 of the bracket 30 has a hole 33 therein through which extends an operating rod 34; said operating rod being freely rotatable in the arm 32 as a bearing. A quadrant 35 is secured to the brace bar 11 and has a hole forming a bearing for the upper portion of the operating rod 34. A block or collar 36 is secured to the operating rod 34 above the quadrant 35 and a handle 37 has a bifurcated end 38 which spans the block 36 and is pivotally connected thereto at 38ª, as shown in Figure 6. The quadrant 35 has notches 39 formed therein in its upper surface; said notches being approximately radial with respect to the axis of the operating rod. The handle or lever 37 has a rib or projecting portion 40 which is capable of engaging within any of the notches 39 and it will be noted that by turning the handle in a plane substantially parallel with the plane of the upper surface of the quadrant that the operating rod 34 will be rotatably moved.

A spring 41 is interposed between the block 36 and the inner portion of the bifurcated end of the hand lever 37 above the pivot 38ª so that said spring normally tends to move the projection 40 of the hand lever toward the upper part of the quadrant 35 and, if said projecting part 40 is in registry with any of the notches 39, to hold said projecting part 40 within the registering notch, a cross bar 42 is secured between its ends to the lower end of the operating rod 34 and preferably extends at right angles to the axis of the operating rod 34. A link rod 43 is pivotally connected to one end of the cross bar 42; said link rod being flexibly connected to the rail 19. This flexible connection between the link rod 43 and the rail 19 is preferably produced by extending the link rod through a hole in the rail 19, said hole being of slightly larger diameter than the diameter of the link rod and then providing nuts on the link rod adjacent opposite faces of the rail 19. In like manner, a link rod 44 is pivotally connected to the opposite end of the cross bar 42, and is flexibly connected to the rail 20 in a manner similar to that described in connection with the link rod 43 and rail 19. Figure 2 shows the parts in their normal position with the hand lever 37 in the central notch of the quadrant and the cross arm 42 in a vertical plane including the axis of the operating rod 34; the rails 19 and 20 not being under tension.

When the parts are in this position, the device can be used by pushing the same along the ground between rows of plants and the teeth 25 will serve to break up the soil. If it is desired to spread the rails 19 and 20 to accommodate and break up a wider portion of the soil, it is merely necessary to withdraw the hand lever out of the central notch and then swing the hand lever clockwise and the link rods 43 and 44 will then spread the rails 19 and 20 and the connected teeth 25 thereon will be moved in opposite directions so as to move up close to the plants. If it is desired to move the teeth in a position closer together than that normally occupied, the hand lever 37 can be swung in an opposite direction to engage within any desired notch in the quadrant and the link rods 43 and 44 will pull the rails toward each other, for example as shown in Figure 4.

The spring 41 serves to move and hold the projecting part 40 of the hand lever within the notch and the tension of the rails 19 and 20 either when spread or contracted also serves to cause the projection 40 to engage the side walls of the notches so as to hold the parts steady during the operation of the device.

In the actual operation of the device it has been found an easy matter to quickly adjust the positions of the ground-engaging elements so that in passing between the rows of plants, if the rows are uneven, the device can be quickly adjusted so that the breaking of the soil can be accomplished suitable to all the plants and it is not necessary to run through a row a number of times in order to break up the soil adjacent all of the plants even though the row is narrower at one portion than at another.

I have used the word cultivator in its broadest sense and it will be understood that the device is capable of use for harrowing, hoeing, plowing, or otherwise breaking up the soil.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A cultivator including a wheel; a pair of handle bars supported thereon; resilient rails of spring steel supported by said wheel; supporting straps pivotally engaging said bars and rails; a brace bar between the upper ends of said handle bars; a bracket extending from said handle bars; a forwardly inclined operating rod supported in said racket and having transverse means fastened to its bottom and pivotally linked to said rails; and lever means supported on said brace bar adjacent the handle parts of said handle bars, and connected to the top of said operating rod to flex said rails and vary the distance between them; substantially as described.

2. A device of the character described including a wheel with an axle therefor; handle bars supported by said axle; hangers supported by said axle; resilient rails of spring steel rigidly attached to said hangers and having pivotal connection with said handle bars; ground engaging means respectively carried by said rails; a cross bar between the upper portion of said handle bars; a bracket extending from said handle bars; an operating rod mounted in said bracket; laterally extending arms secured to the lower end of said operating rod; links pivoted to said arms and said rails; and means supported on said cross bar and connected with the upper end of said rod for operating said rod and flexing said resilient rails; substantially as described.

In testimony whereof I have signed my name to this specification in the presence of two subscribing witnesses.

CHARLES W. SKINNER.

Witnesses:
  ELIZABETH GARBE,
  CHAS. E. POTTS.